Feb. 22, 1938. C. T. KENYON 2,108,861
AEROPLANE CONTROL MECHANISM
Filed July 19, 1935 2 Sheets-Sheet 1
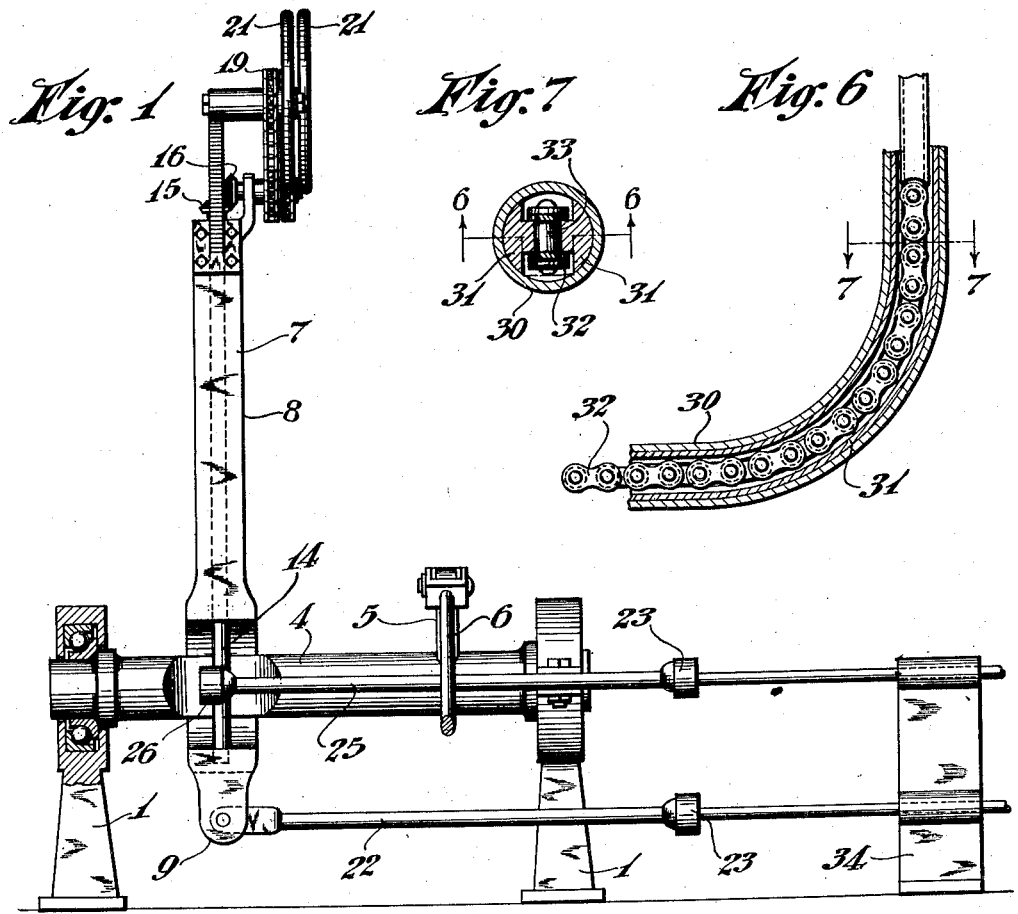
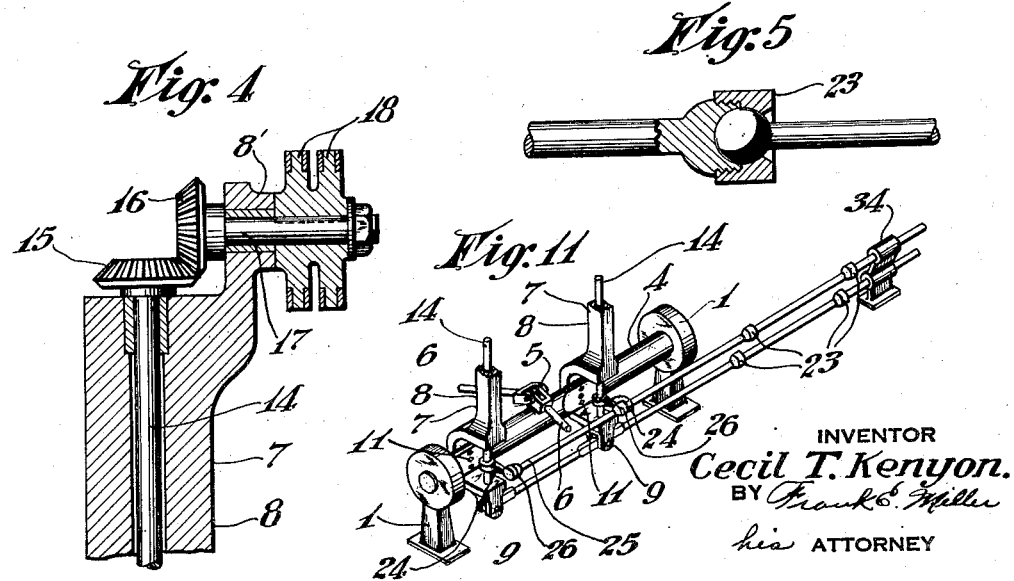
INVENTOR
Cecil T. Kenyon.
BY Frank E. Miller
his ATTORNEY

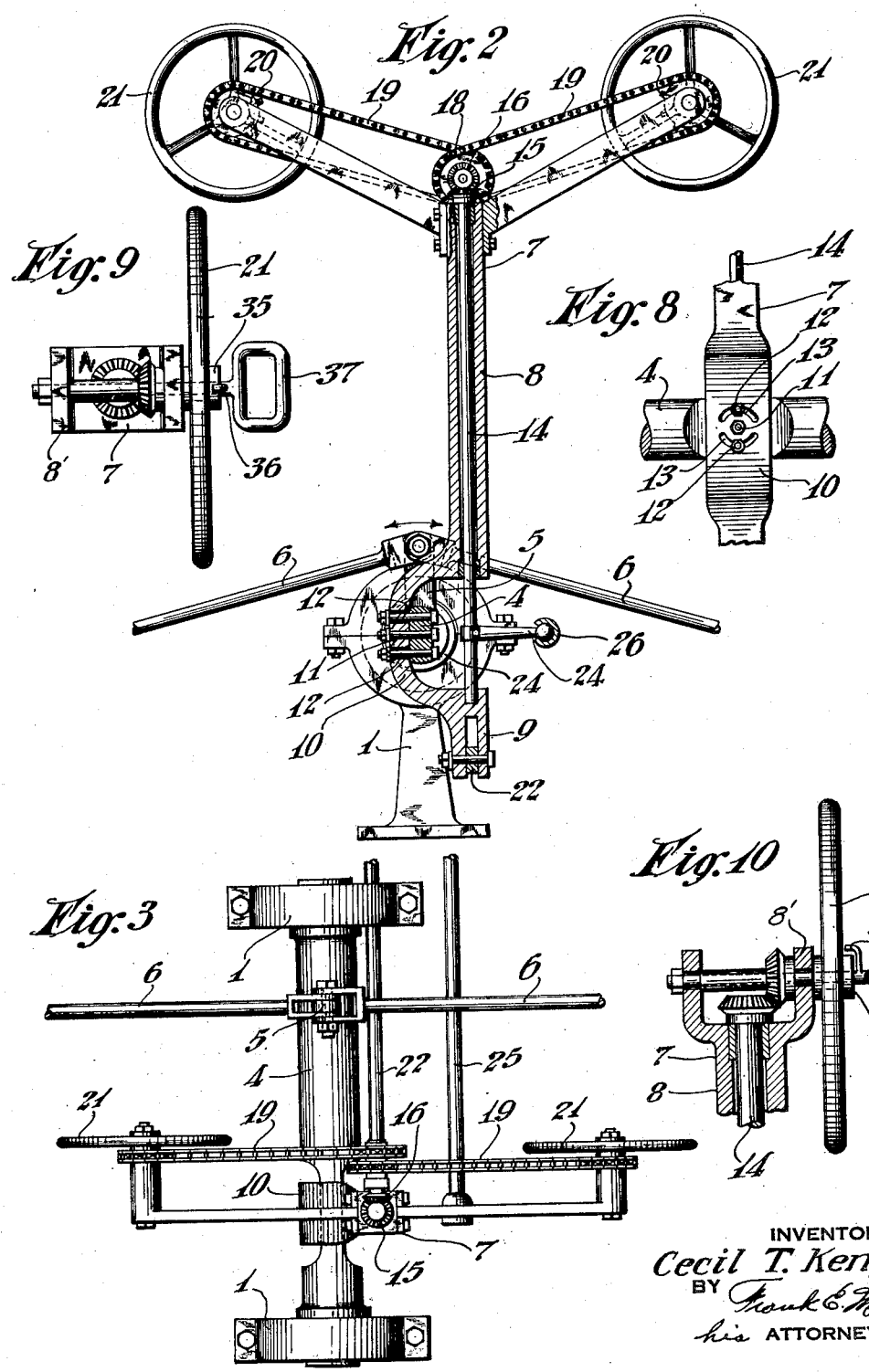

Patented Feb. 22, 1938

2,108,861

UNITED STATES PATENT OFFICE 2,108,861

AEROPLANE CONTROL MECHANISM

Cecil T. Kenyon, Wilmerding, Pa.

Application July 19, 1935, Serial No. 32,201

7 Claims. (Cl. 244—83)

This invention relates to aeroplane control mechanisms, and more particularly to that type of control mechanism employing a single stick for controlling the operation of the control elements of the aeroplane such as the ailerons, the elevators and the rudder, and the present application is in part a continuation of my pending application Serial No. 713,193, filed February 7, 1934.

The principal object of the invention is to provide an improved single stick control mechanism for controlling the ailerons, the elevators and the rudder of an aeroplane.

According to this object the pilot, by the use of his hands, may operate the control elements of an aeroplane which are usually controlled by both hands and feet, thereby providing a safer, more practical and easier operated control.

Another object of the invention is to provide a single stick control mechanism for aeroplanes which dispenses with the usual gear wheels and segments which have heretofore been employed between the control stick and the movable control elements.

With these and other objects in view this invention consists in certain novel features of construction, combination and arrangement of parts to be hereinafter more fully described and claimed.

For a complete understanding of my invention, reference is to be had to the following description and accompanying drawings, in which, Figure 1 is a fragmentary side elevation partly in section illustrating an aeroplane control mechanism constructed in accordance with my invention.

Figure 2 is a transverse sectional view illustrating the same.

Figure 3 is a top plan view illustrating the device.

Figure 4 is a fragmentary sectional view illustrating the gearing between a pair of shafts forming a part of my invention.

Figure 5 is a detail sectional view illustrating a ball and socket joint.

Figure 6 is a fragmentary sectional view illustrating a flexible operating element.

Figure 7 is a detail sectional view taken on the line 7—7 of Figure 6.

Figure 8 is a fragmentary detail view illustrating a pivotal connection between two operatively connected elements of the mechanism.

Figure 9 is a plan view of a portion of the control mechanism.

Figure 10 is a fragmentary sectional view taken on the line 10—10 of Fig. 9.

Figure 11 is a fragmentary perspective view illustrating the invention arranged for tandem control.

Referring in detail to the drawings, the numeral 1 indicates a pair of relatively spaced standards adapted to be suitably secured to an aeroplane, preferably to the floorboard of the cockpit or pilot compartment of the fuselage of said aeroplane and are shaped to receive anti-friction bearings 2 in which are mounted the ends 3 of a main shaft 4. The ends 3 and anti-friction bearings 2 from rotatable connections between the main shaft and the standard so that said main shaft may be rotated in either direction with minimum effort on the part of the pilot or operator. The shaft 4 has an arm 5 which is preferably integral with the shaft and to this arm are pivoted connecting elements 6 which extend transversely of the shaft 4 and which are employed for the operation of the ailerons of the aeroplane.

For the purpose of actuating the shaft 4 and other control elements which will be hereinafter fully described, a joystick or control lever 7 is provided which may comprise a hollow arm 8, a forked arm 9 and an intermediate laterally offset portion 10 which constitutes a portion of each of said arms, said intermediate portion being preferably integral with the arms. The arms 8 and 9 are preferably arranged in longitudinal alignment with each other.

The shaft 4 carries a pivot element which, in the present embodiment of the invention, is in the form of a bolt 11 which is disposed laterally in a plane at right angles to the axis of the shaft. The intermediate offset portion 10 of the control lever 7 is pivotally mounted on the bolt 11 so that the lever may be rocked back and forth in the direction of the length of the shaft and relative to the shaft.

Also carried by the shaft 4 are pins or bolts 12 which are radially disposed with relation to the bolt 11 and which extend through arcuate slots 13 provided in the offset portion 10 of the control lever 7. These bolts constitute stops which limit either the forward or backward movement of the lever relative to the shaft 4.

It has hereinbefore been mentioned that the arm 8 of the control lever is hollow, and extending through this arm is a shaft 14 which, adjacent its upper end, is suitably journaled in a bearing member, and which, at its lower end is journaled in the arm 9, the shaft extending across the space formed by the offset portion 10. The upper end of the shaft 14 is provided with a gear wheel 15 which meshes with a gear wheel 16 secured to a stub shaft 17 journaled in a bracket 8' carried by the arm 8. The outer end of the stub shaft 17 may be provided with spaced sprocket gear wheels 18 which are operatively engaged by sprocket chains 19 driven by sprocket gear wheels 20 rotatably mounted in laterally extending arms carried by the upper end of the arm 8 of the control lever, said gear wheels 20 being adapted to be driven manually through the medium of hand wheels 21.

The forked end of the arm 9 of the control lever has pivoted thereto a connecting element 22 which is provided for the actuation of the elevators of the aeroplane. This connecting element 22 is preferably in the form of sections of rigid rods connected together by a ball and socket joint 23, so that when the control lever is moved laterally to rotate the shaft 4, the rotary movement imparted to the portion of the element connected to the arm 9 will not be transmitted beyond the ball and socket joint. However this connecting element 22 will move freely backwardly and forwardly to bring about the proper operation of the elevators upon rocking the control lever 7 on the pivot bolt 11.

Rigidly secured to the portion of the shaft 14 which extends across the space between the arms 8 and 9 of the control lever is a laterally disposed arm 24 which extends outwardly from the shaft in a direction toward the right hand and is connected with a connecting element 25 by means of a ball and socket joint 26, the ball of which is carried by the arm. The center of the arm 24 and the center of the ball are in alignment with the axis of the pivot bolt 11, so that when the control lever is moved back and forth such motion will not be transmitted to the connecting element 25. The connecting element 25 is for the purpose of controlling the operation of the rudder of the aeroplane and is preferably in the form of sections of rigid rods connected together by a ball and socket joint 26, so that when the control is moved laterally to rotate the shaft 4, the rotary movement thereby imparted to the portion of the connecting element connected to the arm 24 will not be transmitted beyond the joint. However this connecting element is freely movable backwardly and forwardly by the arm 24 upon the rotation of the shaft 14.

In operation, when the control lever 7 is rocked from side to side the shaft 4 and arm 5 carried thereby are correspondingly rocked to effect the operation of the ailerons, and when the control lever is rocked back and forth on the pivot bolt 11 the operation of the elevators is effected and further when the shaft 14 is rotated the operation of the rudder is effected. It will here be noted that when the control lever 7 is being operated to effect the operation of either the ailerons or elevators the shaft 14 may, if desired, be operated to effect the operation of the rudder. It will be understood that the control lever may be rocked from side to side when in any position to which it has been rocked back or forth and that the shaft 14 may be rotated with the lever in any position to which it may be moved, thus the pilot has complete control of the elevators, ailerons and rudder at all times.

Connecting elements such as indicated by the reference characters 6, 22, and 25 may in aeroplane construction be required to extend from the control mechanism on various curves in order to connect with the control elements, such as the elevators, ailerons and rudder and to permit smooth and efficient operations of the connecting elements under these conditions and to obviate the use of the wires which are usually employed, I propose to use in said connecting elements a structure as shown in Figs. 6 and 7. This structure comprises a curved tubular mounting 30 which is rigidly secured in any suitable manner to a rigid part of the aeroplane and in which is mounted oppositely arranged combined guide and track elements 31. Also arranged in the tubular mounting is a flexible element 32 preferably of the sprocket chain type. Rotatably mounted on each rivet which connects the adjacent ends of adjacent links of the chain is a roller 33 which is adapted to engage one or the other of the track portions of said elements 31. The links overlap the track portions of the element and are guided thereby. The connections between the ends of the flexible elements and the rigid portions of the elements 6, 22, and 25 are within the tubular mounting 30 so that the flexible element will be capable of transmitting a pull or push force applied thereto. The elements 22 and 25 are slidably guided in a suitable bracket 34 which is adapted to be secured to a fixed part of the aeroplane.

In Figs. 9 and 10 a modification of the upper portion of the control lever 7 is illustrated in which a single steering wheel is employed having a hub portion 35 which is calibrated, there being a fixed member 36 extending over the hub which when compared with the calibrations will indicate to what degree the rudder is turned. The member 36 may be integral with a nonrotatable handle 37 which is provided for the purpose of controlling the operation of the control lever 7 when the pilot does not desire to hold the steering wheel.

In Fig. 11 two control levers 7 have been shown arranged in tandem for use in aeroplanes having tandem cockpits and which are usually employed in teaching student pilots.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. A control mechanism for aeroplanes comprising a single control lever movable from side to side to control the movement of certain control elements and being pivotally mounted to be movable forwardly and backwardly to control the movement of other control elements, said lever being offset laterally in the vicinity of its pivot, a steering mechanism comprising a rotatable steering shaft carried by the control lever, a longitudinally movable push and pull rudder actuating member, an arm secured to said shaft within the offset position of the lever and operatively connected by means of a ball and socket joint to the rudder actuating member in horizontal alignment with the axis of the pivot for the control lever to prevent the control lever when moved forwardly and backwardly and from side to side from imparting longitudinal movement of the rudder actuating member, and means for actuating said shaft and thereby said arm for imparting longitudinal movement to the rudder actuating member.

2. A control device for aeroplanes comprising a horizontally disposed main shaft, means for supporting said shaft for rotation in either direction, a vertically arranged control lever having an offset portion pivoted to said shaft whereby the latter may be rotated in either direction and the control shaft moved backwardly and forwardly, arms removably secured to the control lever and extending upwardly and outwardly therefrom, and in diverging relation with one another, steering wheels journaled to the ends of the arms, a steering shaft rotatably supported by the control lever with a major portion thereof confined in said control lever and having a portion exposed by said offset whereby an operating medium may be connected to said steering shaft, and means connecting the steering wheels to the steering shaft.

3. A control device for aeroplanes comprising a horizontally disposed main shaft, means for supporting said shaft for rotation in either direction, a vertically arranged control lever having an offset portion pivoted to said shaft whereby the latter may be rotated in either direction and the control lever moved backwardly and forwardly, arms extending outwardly therefrom, steering wheels journaled to the ends of the arms, a steering shaft rotatably supported by the control lever with a major portion thereof confined in said control lever and having a portion exposed by said offset whereby an operating medium may be connected to said steering shaft, and means connecting the steering wheels to the steering shaft.

4. A control device for aeroplanes comprising a horizontally disposed main shaft, means for supporting said shaft for rotation in either direction, a vertically arranged control lever having near its lower end an offset portion pivoted to said shaft whereby the latter may be rotated in either direction and the control lever moved backwardly and forwardly, a steering shaft rotatably supported by the control lever with a major portion thereof confined in said control lever and having a portion exposed by said offset portion whereby an operating medium may be connected to said steering shaft, and manually operable means for rotating said steering shaft and through the medium of which the movement of the control lever is adapted to be effected.

5. A control mechanism for aeroplanes comprising a main shaft, mountings rotatably supporting said main shaft, a vertically arranged control lever having an offset portion pivoted to the main shaft and capable of imparting rotation to the shaft in either direction to actuate certain control elements, and to swing forwardly and backwardly with respect to the main shaft to actuate other control elements, a longitudinally movable member arranged at one side of and parallel with said main shaft operable to actuate other control elements, a vertically arranged shaft rotatably supported by the control lever and extending across the space provided by said offset portion, an arm secured to said shaft within said offset portion and operatively connected beyond the lever to said longitudinally movable member in horizontal alignment with the pivotal connection between the main shaft and control lever, and means for manually rotating said vertically arranged shaft.

6. In combination with an aeroplane having ailerons, elevators and a rudder, means for actuating said ailerons, a rotatable shaft for actuating said means, means for actuating said elevators, a vertically disposed control lever having a laterally offset lower portion pivotally connected to said shaft to render the lever movable back and forth relative to said shaft to actuate the elevator actuating means, said lever being movable from side to side to actuate said shaft, means for actuating said rudder, a steering shaft extending through a central longitudinal bore in the lever and rotatable relative to the lever, the steering shaft being exposed opposite said offset portion, an arm for actuating the rudder actuating means secured to the exposed portion of said steering shaft in horizontal alignment with the axis of the pivotal connection between the first mentioned shaft and control lever, and means for rotating the steering shaft.

7. A control mechanism for aeroplanes comprising a single vertically disposed control lever movable from side to side to control the movement of certain control elements and being pivotally mounted adjacent its lower end to be movable forwardly and backwardly to control the movement of other control elements, said control lever being offset laterally on each side of its pivot to provide a recess open at one side of the lever, a steering mechanism comprising a rotatable steering shaft extending through a central bore in the control lever into said recess, a longitudinally movable rudder actuating member disposed at one side of said lever, an arm secured to said steering shaft within said recess and operatively connected to the rudder actuating member in horizontal alignment with the axis of the pivot for the control lever to prevent the control lever when moved forwardly or backwardly from imparting longitudinal movement to the rudder actuating member, and means for actuating said steering shaft and thereby said arm for imparting longitudinal movement to the rudder actuating member.

CECIL T. KENYON.